US012781398B1

(12) United States Patent
Cai et al.

(10) Patent No.: US 12,781,398 B1
(45) Date of Patent: Nov. 3, 2026

(54) METHOD FOR MANUFACTURING ENVIRONMENTAL COATING FABRIC WITH HIGH AIR PERMEABILITY AND SHAPE STABILITY

(71) Applicant: FUJIAN PUSITE DRESS CO., LTD., Quanzhou City (CN)

(72) Inventors: Can-Rong Cai, Quanzhou City (CN); Shao-Yang Cai, Quanzhou City (CN); Jin-Hui Cai, Quanzhou City (CN); Jun-Rong Cai, Quanzhou City (CN)

(73) Assignee: FUJIAN PUSITE DRESS CO., LTD., Quanzhou City (CN)

( * ) Notice: Subject to any disclaimer, the term of this patent is extended or adjusted under 35 U.S.C. 154(b) by 0 days.

(21) Appl. No.: 19/288,016

(22) Filed: Aug. 1, 2025

(51) Int. Cl.

| | |
|---|---|
| ***D06C 7/02*** | (2006.01) |
| ***B23K 26/38*** | (2014.01) |
| ***B23K 26/402*** | (2014.01) |
| ***D03D 15/242*** | (2021.01) |
| ***D03D 15/283*** | (2021.01) |
| ***D03D 15/573*** | (2021.01) |
| ***D03D 15/587*** | (2021.01) |
| ***D06M 15/507*** | (2006.01) |
| ***D06M 15/564*** | (2006.01) |

(Continued)

(52) U.S. Cl.
CPC ........... *D03D 15/587* (2021.01); *B23K 26/38* (2013.01); *B23K 26/402* (2013.01); *D03D 15/247* (2021.01); *D03D 15/283* (2021.01); *D03D 15/573* (2021.01); *D06C 7/02* (2013.01); *D06M 15/507* (2013.01); *D06M 15/564* (2013.01); *D06M 15/643* (2013.01); *B23K 2101/34* (2018.08); *B23K 2103/38* (2018.08); *D10B 2321/0211* (2013.01); *D10B 2331/041* (2013.01); *D10B 2501/043* (2013.01)

(58) Field of Classification Search
CPC .......... D06C 7/00; D03D 15/40; D03D 15/47; D03D 15/54; D03D 11/00; Y10T 442/3293; D06M 2101/34
See application file for complete search history.

(56) References Cited

U.S. PATENT DOCUMENTS 5,102,725 A * 4/1992 Knox .................... D03D 11/02
442/205
RE49,354 E * 1/2023 Norris ................... D03D 15/00

(Continued)

*Primary Examiner* — Jillian K Pierorazio
(74) *Attorney, Agent, or Firm* — Demian K. Jackson; Jackson IPG PLLC

(57) ABSTRACT

A method for manufacturing environmental coating fabric contains: (a) a step of preparing a design drawing, (b) a step of preparing multiple warp and multiple weft yarns, (c) weaving in a first heat setting treatment step, (d) width unloading and executing the second heat setting treatment step, (e) a step of a coloring treatment, and (f) a step of aligning the design drawing and forming pieces. The multiple warp yarns include thermoplastic-coating yarns and high-strength twisted yarns. The multiple weft yarns are thermoplastic-coating yarns, the multiple warp yarns and the multiple weft yarns are treated in a first heat-setting treatment step and a second heat-setting treatment step to enhance structural stability, wear resistance, and air permeability. The first heat setting treatment step is executed by non-contact heating to avoid melting and contamination caused by the coating material contacting metal parts.

5 Claims, 6 Drawing Sheets

(51) Int. Cl.

| | |
|---|---|
| ***D06M 15/643*** | (2006.01) |
| *B23K 101/34* | (2006.01) |
| *B23K 103/00* | (2006.01) |

(56) References Cited

U.S. PATENT DOCUMENTS

| | | | | |
|---|---|---|---|---|
| 2014/0096420 | A1* | 4/2014 | Ronner | D03D 15/258 38/100 |
| 2014/0227474 | A1* | 8/2014 | Cramer | D06C 7/00 28/165 |
| 2019/0093270 | A1* | 3/2019 | Ronchi | D06B 17/00 |
| 2019/0093271 | A1* | 3/2019 | Ronchi | D06P 1/228 |
| 2019/0376212 | A1* | 12/2019 | Bryant | B32B 5/08 |
| 2020/0255986 | A1* | 8/2020 | Tam | D03D 15/587 |
| 2020/0376797 | A1* | 12/2020 | Chen | D03D 15/56 |
| 2022/0205147 | A1* | 6/2022 | Phillips | D03D 15/54 |
| 2022/0354207 | A1* | 11/2022 | Toronjo | A43B 23/024 |
| 2024/0018702 | A1* | 1/2024 | Jones | D03D 49/04 |
| 2024/0133085 | A1* | 4/2024 | Morgis | D03D 15/573 |
| 2024/0301594 | A1* | 9/2024 | Tack | D03D 13/004 |
| 2025/0034893 | A1* | 1/2025 | King | D03D 15/527 |
| 2025/0163640 | A1* | 5/2025 | Petri | D03D 11/02 |

* cited by examiner

METHOD FOR MANUFACTURING ENVIRONMENTAL COATING FABRIC WITH HIGH AIR PERMEABILITY AND SHAPE STABILITY

TECHNICAL FIELD

The present invention relates to a functional textile manufacturing technology field, and more particularly to a method for manufacturing environmental coating fabric.

BACKGROUND

A conventional woven fabric is made of multiple warp yarns and multiple weft yarns that are tightly interwoven. Although they have a certain structural strength, a high density of yarn interweaving results in poor air permeability. When being used in high-temperature or humid environments, they cause stuffiness and discomfort easily, thus affecting wearing comfort. In addition, the conventional fabric weaving process lacks an effective yarn fixing mechanism, which easily leads to problems (such as yarn slippage and grain deviation), thus affecting the appearance integrity and structural stability of the fabric.

To improve the above-mentioned shortcomings, another conventional fabric is developed, and a body of the fabric is interwoven with multiple warp yarns and multiple weft yarns. The multiple warp and weft yarns are made of high-strength materials and coated with an adhesive layer thereon. The adhesive layer is an adhesive slurry. During the weaving process, a heating device provided by the machine is used for preliminary shaping, and then a hot stamping and high-temperature dyeing, and finishing treatments are applied to complete a second shaping to improve the shape stability of the fabric while maintaining its softness and good air permeability.

However, this conventional technology uses contact heating in a weaving stage, for example, a heating wheel or a heating tube is used to directly contact a coating yarn to heat and shape the coating yarn. Thereby, the coating material will melt and adhere or become contaminated due to contact with metal parts, which not only affects the heating efficiency and shaping quality but also causes the machine to be frequently shut down for cleaning, so it is not conducive to continuous production operations and leads to a decrease in production efficiency.

The present invention has arisen to mitigate and/or obviate the afore-described disadvantages.

SUMMARY

The primary aspect of the present invention is to provide a method for manufacturing environmental coating fabric by which multiple warp yarns include thermoplastic coating yarns and high-strength twisted yarns, and the multiple weft yarns are thermoplastic coating yarns, the multiple warp yarns and the multiple weft yarns are treated in a first heat setting treatment step and a second heat setting treatment step to enhance structural stability, wear resistance, and air permeability. The first heat setting treatment step is executed by non-contact heating to avoid the problem of melting and contamination caused by the coating material contacting metal parts. Preferably, the air permeability and lightweight property of the fabric are enhanced to ensure a stable fabrication.

Another aspect of the present invention is to provide a method for manufacturing environmental coating fabric in which coating layers are the environmental coating layers that are micro-melted or thermoset, which not only have good adhesion and thermal stability, but also comply with the trend of environmental protection and sustainable development to be suitable for application in a green textile market.

To obtain the above-mentioned aspect, a method for manufacturing environmental coating fabric provided by the present invention contains: (a) a step of preparing a design drawing, (b) a step of preparing multiple warp and multiple weft yarns, (c) weaving in a first heat setting treatment step, (d) width unloading and executing the second heat setting treatment step, (e) a step of a coloring treatment, and (f) a step of aligning the design drawing and forming pieces.

In the step of preparing a design drawing, a weaving pattern with an openwork structure is designed and input into a control system of a digitally controlled shuttle loom.

In the step of preparing multiple warp and multiple weft yarns, the multiple warp yarns adopt a double-head different yarn supply mode, an upper head supplies thermoplastic coating yarns, and a lower head supplies uncoating high-strength twisted yarns; the multiple weft yarns are provided with thermoplastic coating yarns, the thermoplastic coating yarns are high-strength twisted yarns with a micro-melted or the multiple thermosetting environmental coating layers coating on thereon.

When weaving in the first heat setting treatment step, a shuttle loom is started to weave, and the multiple warp yarns and the multiple weft yarns are interwoven into the fabric, the multiple warp yarns of the fabric adopt a rule of a spacing between each loop, and the multiple warp yarns are added to each loop, among the multiple warp yarns of each loop, odd-numbered warp yarns are set as the thermoplastic coating yarns, and even-numbered warp yarns are set as the high-strength twisted yarns; the multiple yarns are heated and shaped by using a non-contact heating module arranged above a weaving mouth, wherein a heating temperature of the non-contact heating module is between 150° C. and 220° C., such that a coating layer of a fiber is initially melted to improve an initial structural stability.

For the width unloading and executing the second heat setting treatment step, the fabric is cut and removed from a machine, and then the fabric is guided into a high temperature pre-shrinking module to execute a second heat setting, a heating temperature of the high temperature pre-shrinking module is within 195° C. to 205° C., thus obtaining a consistent size of mesh holes and enhancing flexibility and flatness of the fabric.

In the step of a coloring treatment, the fabric that has been pre-shrunk and shaped at high temperature is colored.

In the step of aligning the design drawing and forming pieces, a film positive is made based on design requirements, and the fabric is aligned and cut into shape by using a laser cutting device.

BRIEF DESCRIPTION OF THE DESIGN DRAWINGS

DETAILED DESCRIPTION

Figure 1:
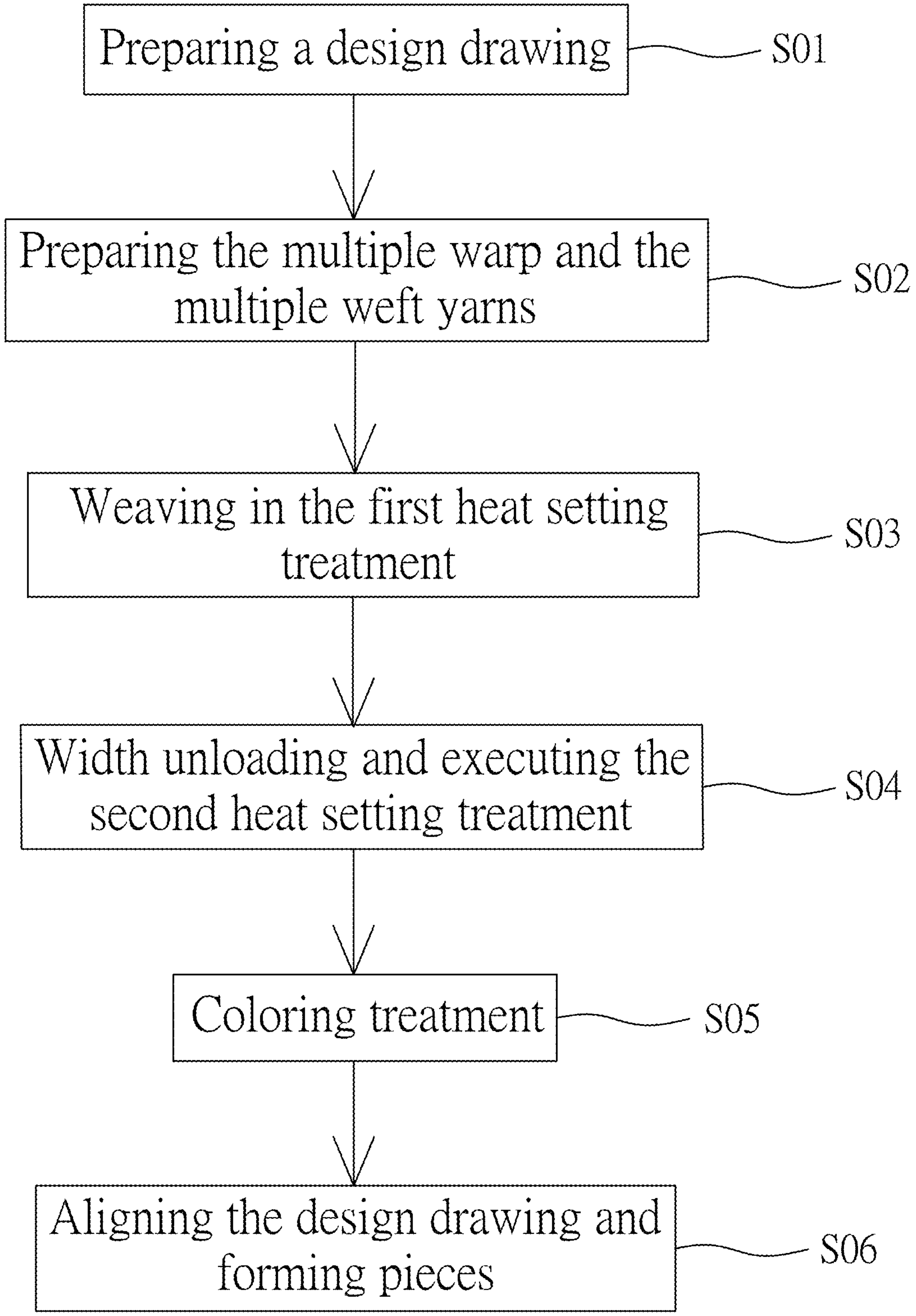
FIG. 1 is a block diagram showing steps of a method for manufacturing environmental coating fabric with high air permeability and shape stability according to a preferred embodiment of the present invention.
Figure 2:
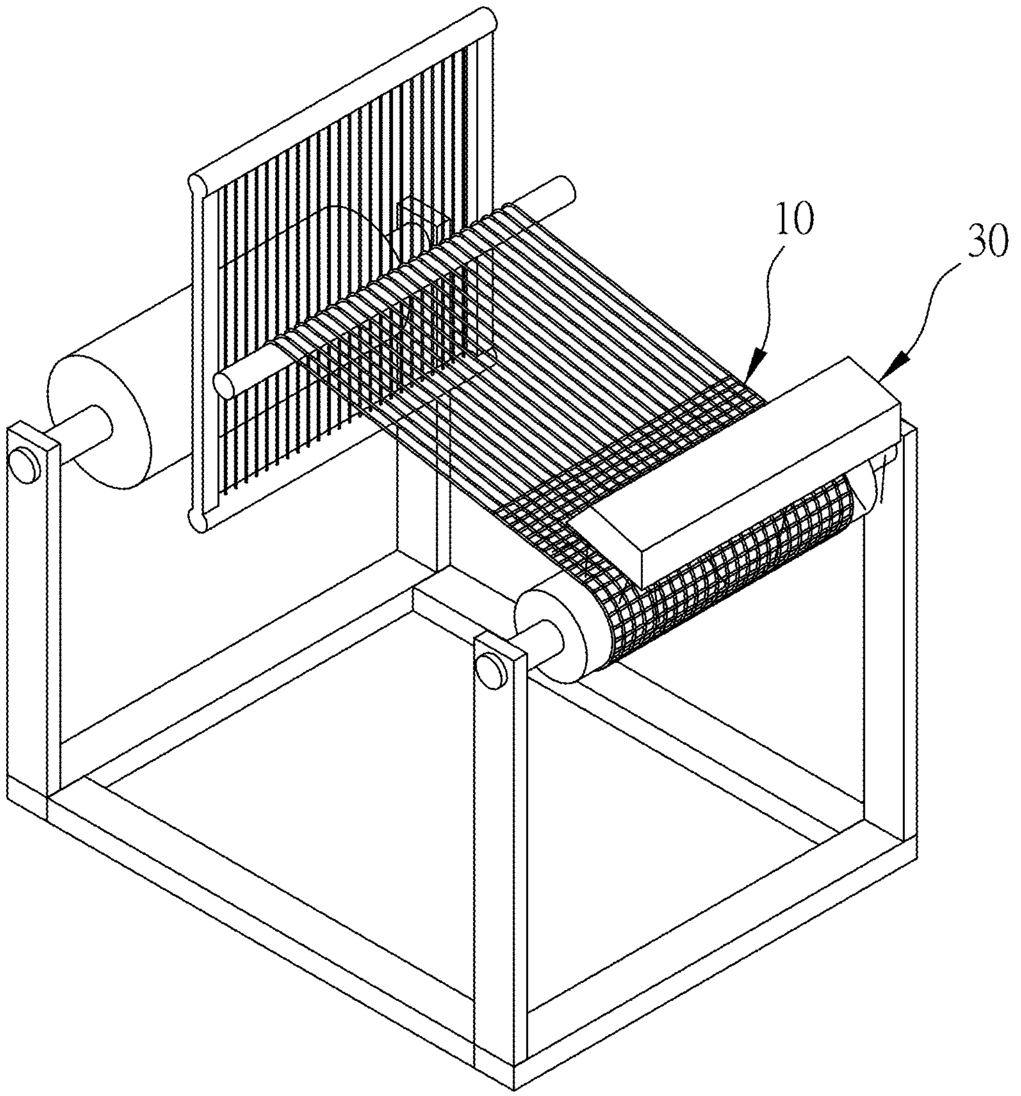
FIG. 2 is a perspective view showing the operation of a first heat setting treatment step of the method according to the preferred embodiment of the present invention.
Figure 3:
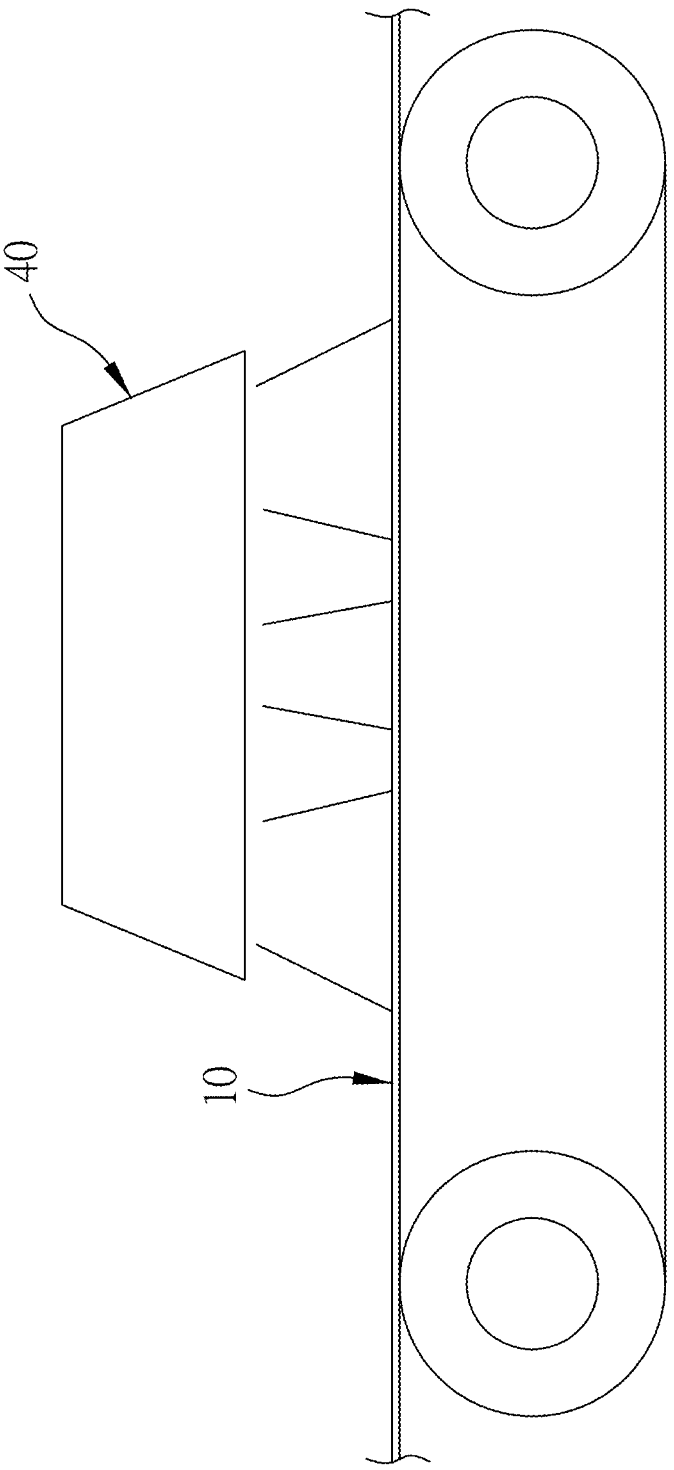
FIG. 3 is a side plan view showing the width of unloading and executing the second heat setting treatment step of the method according to the preferred embodiment of the present invention.
Figure 4:
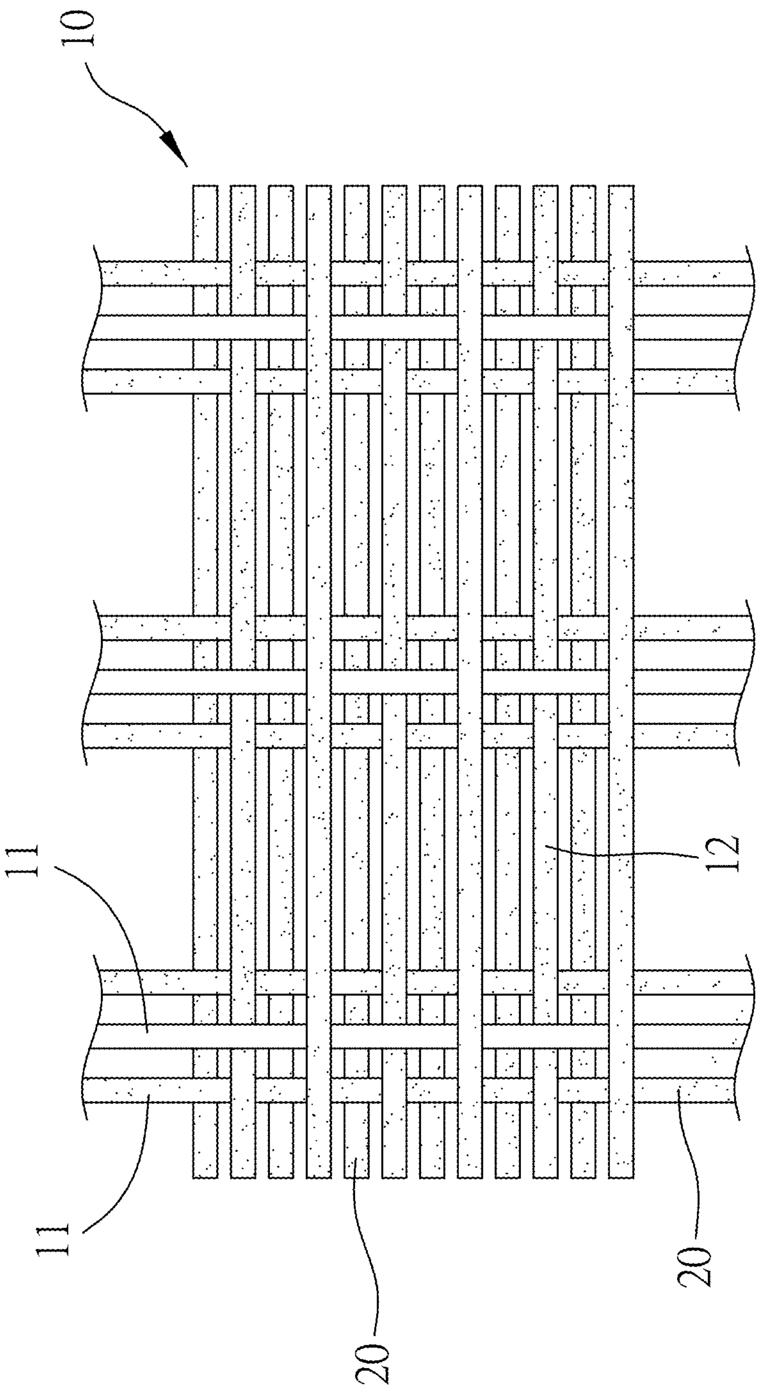
FIG. 4 is a top plan view showing a woven texture structure made by the method according to the preferred embodiment of the present invention.
Figure 5:
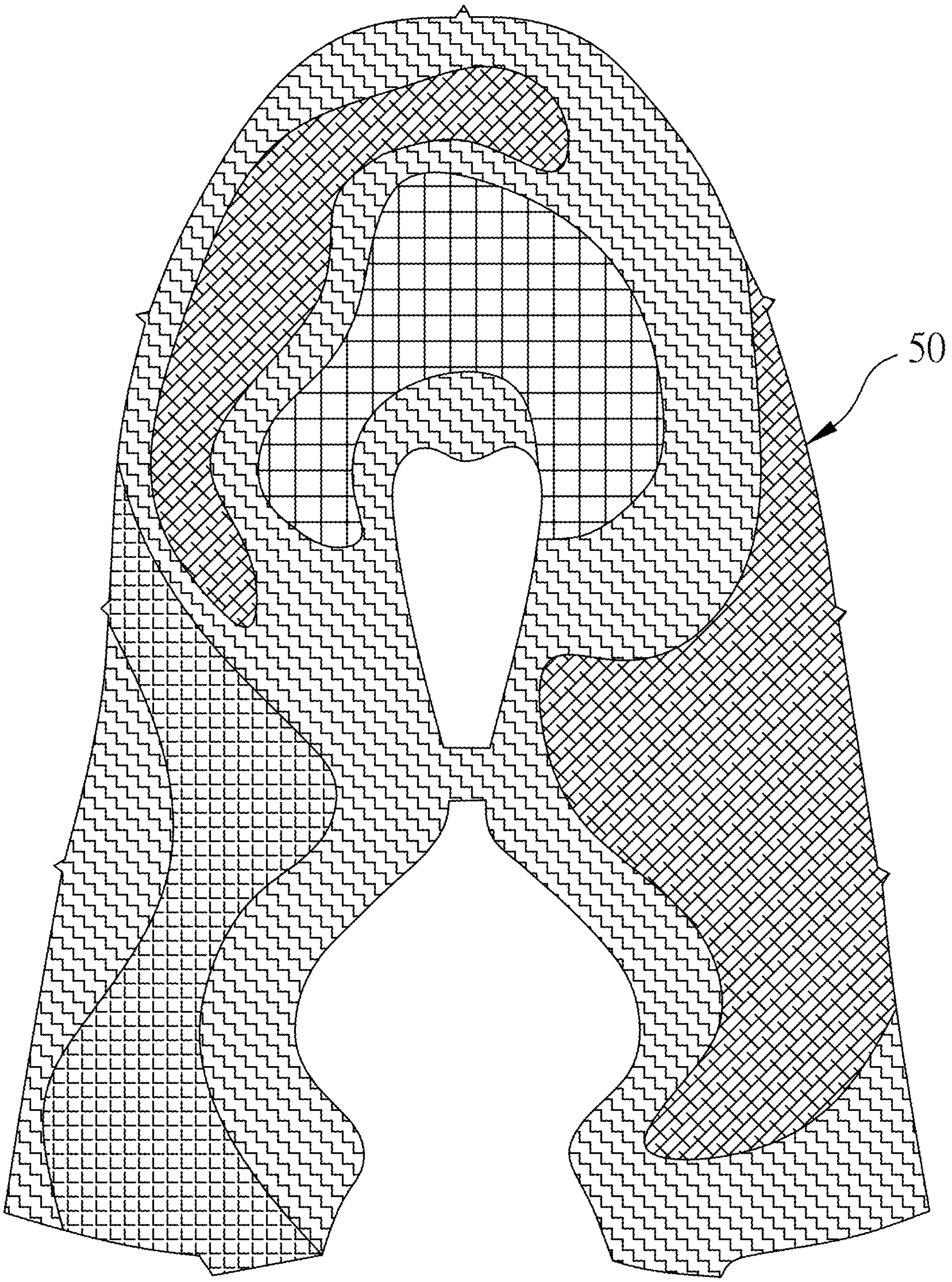
FIG. 5 is a top plan view showing aligning the design drawing and forming pieces of the method according to the preferred embodiment of the present invention.

With reference to FIGS. 1-5, a method for manufacturing environmental coating fabric with high air permeability and shape stability according to a preferred embodiment of the present invention, the fabric 10 is formed by interweaving multiple warp yarns 11 and multiple weft yarns 12, wherein the multiple warp yarns 11 include thermoplastic coating yarns and high-strength twisted yarns, and the multiple weft yarns 12 are thermoplastic coating yarns. The thermoplastic-coating yarns are formed by coating micro-melted or multiple thermosetting environmental coating layers 20 on high-strength twisted yarns. The high-strength twisted yarns are selected from any one of ultra-high molecular weight polyethylene (UHMWPE), basalt fiber, polylactic acid (PLA) and a combination of the UHMWPE, the basalt fiber, and the PLA. The multiple environmental coating layers 20 are any one of micro-melted thermoplastic polyurethane (TPU), polylactic acid (PLA) and silicone nano coating layer. The fabric 10 is treated in a first heat setting treatment step and a second heat setting treatment step in order, wherein the first heat setting treatment step is executed by non-contact heating in a weaving process, and the second heat setting treatment step is executed by a high temperature pre-shrinking and setting after the weaving is completed. Various patterns are formed from multiple weft yarns 12 in different weaving manners.

In this embodiment, the multiple warp yarns 11 of the fabric 10 are arranged with a spacing G between each loop, and the multiple warp yarns 11 (in this embodiment, three warp yarns are provided) are added to each loop. Among the multiple warp yarns 11 in each loop, odd warp yarns 11 are thermoplastic-coating yarns (the first and third warp yarns are provided in this embodiment), and even warp yarns 11 are high-strength twisted yarns (the second warp yarn is provided in this embodiment).

The method of this embodiment comprises:

(a) a step S01 of preparing a design drawing, wherein a weaving pattern with an openwork structure is designed and input into a control system of a digitally controlled shuttle loom. The pattern includes an interweaving path of the multiple warp and weft yarns, a distribution pattern of multiple yarn holes, and a pattern. After a design is completed, the design drawing is transferred to an electronic file and accurately input into the control system of the digitally controlled shuttle loom to guide a subsequent automated weaving process and maintain the accuracy and stability of a fabric structure.

(b) a step S02 of preparing the multiple warp and the multiple weft yarns, wherein the multiple warp yarns 11 adopt a double-head different yarn supply mode, an upper head supplies thermoplastic coating yarns, and a lower head supplies uncoating high-strength twisted yarns. The multiple weft yarns 12 are provided with thermoplastic coating yarns; the thermoplastic coating yarns are high-strength twisted yarns with a micro-fusible or the multiple thermosetting environmental coating layers 20 coating thereon. The double-head design and grouping structure effectively improve stability and partially control the capabilities of the fabric. The multiple weft yarns 12 are prepared based on the fabric structure and functional requirements to be equipped with up to the multiple weft yarns 12 of eight different specifications, and the multiple weft yarns 12 are preset in a weft storage device and arranged in order of design patterns. By using different weft yarn weaving methods, a variety of patterns are formed to increase product design flexibility and market differentiation.

(c) weaving in the first heat setting treatment step S03, wherein the shuttle loom is started to weave, and the multiple warp yarns 11 and the multiple weft yarns 12 are interwoven into the fabric, the multiple warp yarns 11 of the fabric 10 adopt a rule of a spacing G between each loop, and three warp yarns 11 are added to each loop to form a perforated structure. Among the three warp yarns 11 of each loop, the odd-numbered (i.e., first and third) warp yarns 11 are set as the thermoplastic coating yarns, and the even-numbered (i.e., second) warp yarn 12 is set as the high-strength twisted yarn. The first warp yarn 11 and the third warp yarn 11 of each loop come from the upper head, and the second warp yarn 11 comes from the lower head. In the meantime, the first warp yarn 11 and the second weft yarn 12 are heated and shaped by using a non-contact heating module 30 (such as an infrared radiation array or a hot air deflector) arranged above a weaving mouth, such that the multiple environmental coating layers 20 on the fabric are initially melted to improve a structural stability. The non-contact heating module 30 matches to control a heating temperature between 150° C. and 220° C. An infrared temperature sensor and a distance adjustment rod are arranged in the device, and a heating distance is adjustable between 5 mm to 20 mm according to the thickness of the fabric. The non-contact heating module 30 is synchronized with a weaving process to instantly soften the coating yarns, complete an initial shaping and fix the position of a weaving point, and avoid a problem of melting and contamination caused by the coating material contacting metal parts at a high temperature.

(d) width unloading and executing the second heat setting treatment step S04, wherein the fabric 10 is cut and removed from the machine (e.g., an initial width is 180 cm, and a cut width is 160 cm), and then the fabric is guided into a high temperature pre-shrinking module 40 to execute a second heat setting. The high-temperature pre-shrinking module 40 has a double-stage high-temperature hot air cavity. After the fabric is unloaded from the machine, the fabric is treated at a high temperature of 195° C. to 205° C. by precisely controlling the hot air. By using the high temperature treatment, a slight shrinkage and a surface re-leveling of the coating layers occur, thus obtaining a consistent size (up to ±5%) of mesh holes and a stable shape. Preferably, a post-processing deformation of a finished product is decreased, the flexibility and flatness of the fabric are enhanced, thus ensuring shape memory ability and an excellent visual effect of the fabric.

(e) a step S05 of a coloring treatment, wherein the fabric 10 that has been pre-shrunk and shaped at high temperature is colored. This step is executed in any one of a dip dyeing, printing, a digital inkjet printing, a coating dyeing manner, and a combination of the dip dyeing, printing, the digital inkjet printing, and the coating dyeing manner to achieve the color and patterns of the fabric. It is to be noted that a selected dye or a pigment is compatible with a material of the multiple environmental coating layers 20 to achieve outstanding color fastness and environmental protection standards. After the fabric 10 is colored, the fabric 10 is dried and the color is fixed to obtain the stability and durability of the color.

(f) a step S06 of aligning the design drawing and forming pieces, wherein a film positive is made based on design requirements, and the fabric is aligned and cutting shaped by using a laser cutting device to form a finished product 50, thus obtaining an accurate size and neat edges to avoid burrs and deformation that is caused by conventional cutting manner and to improve a quality.

Figure 6:
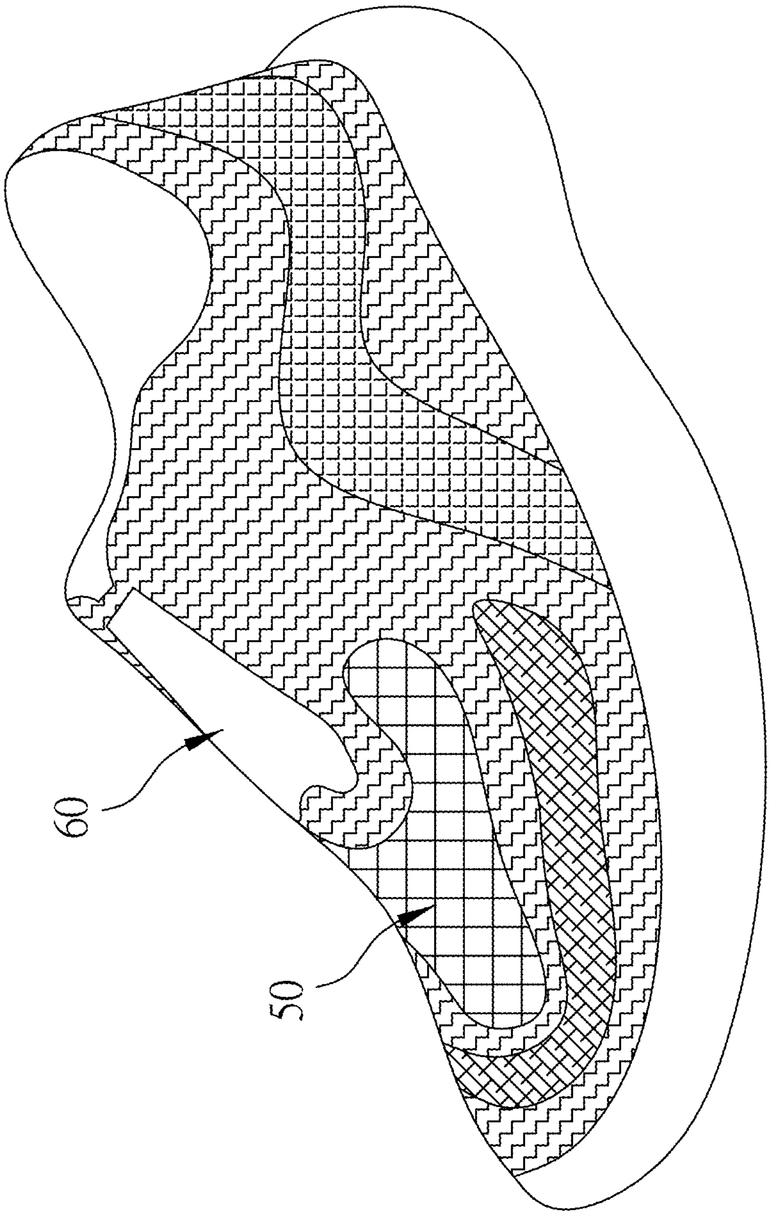
FIG. 6 is a perspective view showing the application of the method according the preferred embodiment of the present invention.

With reference to FIG. 6, when the finished product 50 is a shoe 60, the shoes 60 have excellent breathability and comfort. A unique weaving structure of the shoes 60 effectively wicks away sweat, keeps the shoes dry, and reduces odors. In addition, the finished product 50 has reinforced strength and wear resistance, thus prolonging the service life of the shoes 60. A lightweight property of the finished product 50 makes the shoes 60 more flexible and suitable for various sports requirements. For an appearance design, the finished product 50 provides a variety of colors and patterns to choose from so as to meet the personalized needs of different consumers. The use of environmental materials is in line with the concept of sustainable development and is environmentally friendly. Whether it is daily wear or professional sports, the finished product 50 provides users with an excellent wearing experience and becomes an ideal choice for footwear products.

Thereby, the method of the present invention has advantages as follows:

1) The multiple first warp yarns 11 of the fabric 10 include the thermoplastic coating yarns and the high-strength twisted yarns, and the multiple weft yarns 12 are thermoplastic coating yarns, wherein the fabric 10 is treated in the first heat setting treatment step and the second heat setting treatment step in order, and the first heat setting step is executed by non-contact heating in the weaving process, hence the coating material is initially melted to improve a connection strength, a shape stability and a wear resistance between the multiple first warp yarns and the multiple weft yarns, and promote the shrinkage and stability of the mesh structure, thus enhancing air permeability, lightness and dimensional stability of the fabric. Preferably, it is capable of effectively avoiding melt adhesion and contamination caused by contact among the coating layers and metal components, so that the machine operates stably for a long time to improve the stability and production efficiency when forming the fabric.

2) The coating layers are the environmental coating layers, which are micro-melted or thermoset, such as thermoplastic polyurethane (TPU), polylactic acid (PLA) or silicone nano coating layers. It not only has good adhesion and thermal stability, but also complies with a trend of environmental protection and sustainable development to be suitable for application in a green textile market.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A method for manufacturing environmental coating fabric with high air permeability and shape stability comprising:

(a) a step of preparing a design drawing, wherein a weaving pattern with an openwork structure is designed and input into a control system of a digitally controlled shuttle loom;

(b) a step of preparing multiple warp and multiple weft yarns, wherein the multiple warp yarns adopt a double-head different yarn supply mode, an upper head supplies thermoplastic coating yarns, and a lower head supplies uncoating high-strength twisted yarns; wherein the multiple weft yarns are provided with thermoplastic coating yarns, the thermoplastic coating yarns are high-strength twisted yarns with a micro-melted or the multiple thermosetting environmental coating layers coating on thereon and wherein the multiple weft yarns are preset in a weft storage device and arranged in order in accordance with the prepared design;

(c) weaving in a first heat setting treatment step, wherein a shuttle loom is started to weave, and the multiple warp yarns and the multiple weft yarns are interwoven into the fabric, the multiple warp yarns of the fabric adopt a rule of a spacing between each loop, and the multiple warp yarns are added to each loop, among the multiple warp yarns of each loop, odd-numbered warp yarns are set as the thermoplastic coating yarns, and even-numbered warp yarns are set as the high-strength twisted yarns; the multiple warp and weft yarns are heated and shaped by using a non-contact heating module arranged above a weaving mouth, wherein a heating temperature of the non-contact heating module is between 150° C. and 220° C., such that a coating layer of a fiber is initially melted to improve an initial structural stability;

(d) width unloading and executing the second heat setting treatment step, wherein the fabric is cut and removed from a machine, and then the fabric is guided into a high temperature pre-shrinking module to execute a second heat setting, a heating temperature of the high temperature pre-shrinking module is within 195° C. to 205° C., thus obtaining a consistent size of mesh holes and enhancing flexibility and flatness of the fabric;

(e) a step of a coloring treatment, wherein the fabric that has been pre-shrunk and shaped at high temperature is colored; and (f) a step of aligning the design drawing and forming pieces, wherein a film positive is made based on design requirements, and the fabric is aligned and cut into shape by using a laser cutting device.

2. The method as claimed in claim 1, wherein the non-contact heating module is an infrared radiation array or a hot air deflector.

3. The method as claimed in claim 1, wherein the step of the coloring treatment is executed in any one of a dip dyeing, a printing, a digital inkjet printing, a coating dyeing manner, and a combination of the dip dyeing, the printing, the digital inkjet printing, and the coating dyeing manner.

4. The method as claimed in claim 1, wherein the high-strength twisted yarns are selected from any one of ultra-high molecular weight polyethylene (UHMWPE), basalt fiber, polylactic acid (PLA), and a combination of the UHMWPE, the basalt fiber, and the PLA.

5. The method as claimed in claim 1, wherein the multiple environmental coating layers are any one of micro-melted thermoplastic polyurethane (TPU), polylactic acid (PLA), and silicone nano coating layers.

* * * * *